Aug. 2, 1927. 1,637,812
I. P. FERGUSON
REMOVABLE CLOSURE FOR VEHICLES
Filed Dec. 8, 1924 2 Sheets-Sheet 2
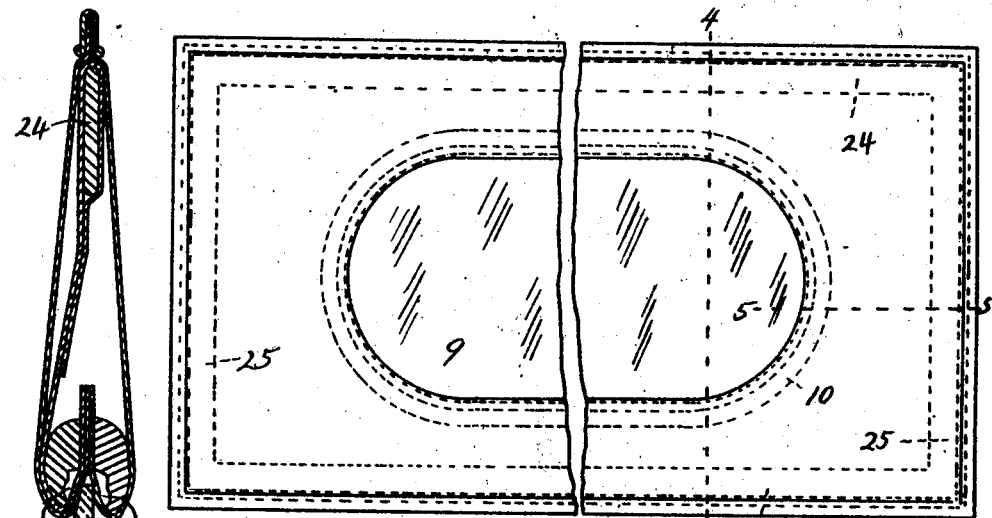
Fig. 3.
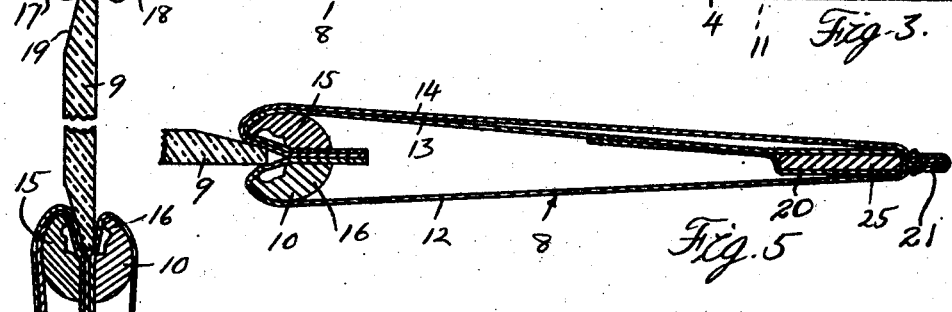
Fig. 5.
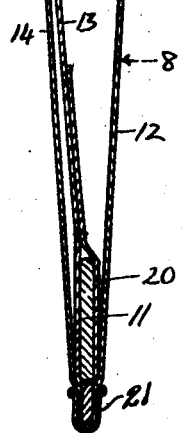
Fig. 4.
Fig. 6.
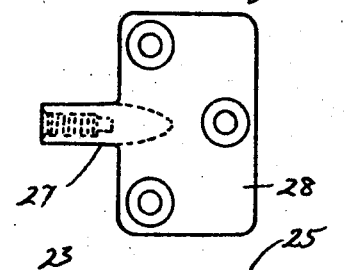
Fig. 8.
Inventor
Ivan P. Ferguson
Attorneys Patented Aug. 2, 1927.

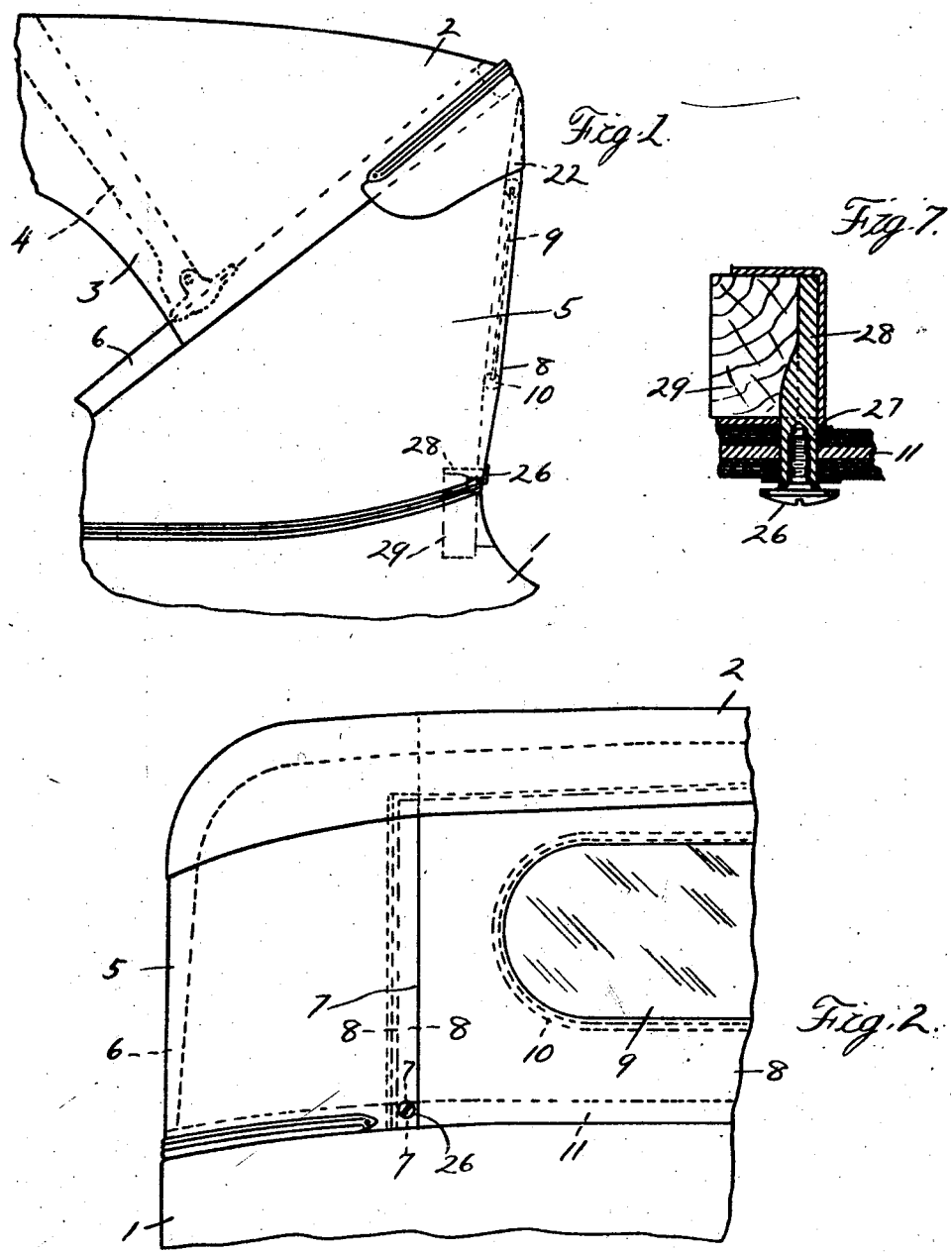

1,637,812

UNITED STATES PATENT OFFICE.

IVAN P. FERGUSON, OF DETROIT, MICHIGAN, ASSIGNOR TO TOWSON BODY CO., OF DETROIT, MICHIGAN, A CORPORATION OF MICHIGAN.

REMOVABLE CLOSURE FOR VEHICLES.

Application filed December 8, 1924. Serial No. 754,682.

This invention relates generally to removable closures for vehicles and refers more particularly to the rear window sections of motor vehicle bodies of the open type.

One of the essential objects of the invention is to provide a light and durable window section that may be easily and quickly attached to or detached from the vehicle.

Another object is to provide a neat and attractive window section which is simple in construction and can be manufactured at a comparatively low cost.

With the above and other objects in view, the invention consists of certain novel features of construction, combinations and arrangements of parts as will be more fully described and particularly pointed out in the appended claims.

In the accompanying drawings:

Figure 1 is a fragmentary side elevation of a vehicle embodying my invention.

Figure 2 is a rear elevation thereof.

Figure 3 is a rear elevation of the removable window section.

Figure 4 is a vertical sectional view taken on the line 4—4 of Figure 3.

Figure 5 is a fragmentary sectional view taken on the line 5—5 of Figure 3.

Figure 6 is a top plan view of one of the inner plates.

Figure 7 is a section on the line 7—7 of Figure 2.

Figure 8 is a section on the line 8—8 of Figure 2.

Referring now to the drawings, in which like characters of reference designate corresponding parts throughout the several views, the numeral 1 designates a vehicle body having a top 2 which preferably comprises a suitable fabric covering 3 and the supporting bows 4. As shown, a suitable fabric covering 5 preferably extends between the rearwardly extending bow 6 and the upper edges of the body 1 and is preferably provided at the back of the body with a suitable opening 7.

For closing the opening 7 in the covering 5 I preferably provide a window section 8 that is provided with a suitable transparent member such as the elongated glass panel 9. As shown, this glass panel is mounted in a rigid frame 10 which is preferably supported in a rigid outer frame 11 by suitable fabric coverings 12, 13 and 14 respectively. The inner frame 10 may be of any suitable construction but is preferably formed of two sections 15 and 16 that are provided at their inner opposed edges with suitable grooves 17 and 18 respectively for receiving the beveled edges 19 of the glass panel 9. The outer frame 11 is preferably formed of flat bars of band iron and is preferably located within a suitable pocket 20 of the fabric covering 13. This fabric covering 13 may be formed of any suitable material and is preferably concealed by the coverings 12 and 14 respectively. These coverings 12 and 14 respectively preferably extend beyond the pocket 20 and are secured together at their outer edges by suitable bindings 21, while the intermediate covering 13, as well as the coverings 12 and 14 respectively, is preferably folded over and clamped between the sections 15 and 16 respectively of the frame 10. As shown, the coverings 13 and 14 respectively are preferably folded in overlapping relation over the section 15 of the frame, while the covering 12 is folded over the section 16. Thus a neat and practical joint is provided between the coverings and the inner frame 10.

In order that the window section 8 may be readily attached to or detached from the back covering 5, I preferably provide suitable pockets 22 and 23 respectively at the upper and side edges of the opening 7, for receiving the top and end bars 24 and 25 respectively of the frame 11. For detachably holding the window section 8 in the pockets 22 and 23 I preferably provide two screws 26 that extend through the frame 11 at the opposite ends thereof and threadedly engage the tubular projections 27 of suitable hanger plates 28 that are preferably rigidly secured to the framework 29 of the vehicle body.

Thus, from the foregoing description, it will be readily apparent that I have provided an extremely simple window section that is neat and compact in construction and can be easily and quickly attached to or detached from the back covering 5 of the vehicle. Moreover, the arrangement of the frames 10 and 11 is such that the glass panel 9 will be yieldably held in position. Furthermore, the arrangement of the pockets 22 and 23 respectively is such that only two screws are required to hold the removable window section in assembled position.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:—

1. The combination with a vehicle body and a top therefor, of a flexible covering extending between the body and top having an opening therein and pockets at the top and side edges of the opening, a closure for the opening engaging the pockets, a transparent panel for said closure, and means for holding the closure in the pockets, including a headed element engaging the closure and body.

2. The combination with a vehicle body and a top therefor, of a covering extending between the body and top having an opening therein and communicating pockets at certain of the edges of said opening, a removable window section engaging said pockets and means for holding said window section in said pockets including anchor plates rigidly secured to the body, and headed elements carried by the window section threadedly engaging the anchor plates.

3. A closure member for vehicles, comprising a transparent member, a sectional frame therefor, a supporting frame, a fabric covering secured to the sectional frame and having a pocket receiving the supporting frame, and fabric coverings concealing the fabric covering aforesaid and having portions clamped between the sections of the first frame.

4. A closure member for vehicles, comprising a transparent member, a sectional frame surrounding said transparent member, a supporting frame spaced from said sectional frame, a fabric covering, a flexible covering having an opening for said transparent member, the edges of said flexible covering adjacent the opening being secured to the sectional frame and the outer edges of said fabric covering being formed with a pocket receiving said supporting frame, and fabric coverings concealing the flexible covering aforesaid and having portions clamped between the sections of said first frame.

5. A closure member for vehicles, comprising a glass panel, a sectional frame therefor, a supporting frame spaced from the sectional frame, fabric coverings surrounding said panel having the inner edges thereof clamped between the sections of said sectional frame and the outer edges secured together, and a flexible covering disposed between the coverings aforesaid having the inner edge secured to the sectional frame and the outer edge thereof being formed with a pocket receiving said supporting frame.

6. The combination with a vehicle body and a top therefor, of a flexible covering extending between the body and top having an opening therein and communicating pockets at certain edges of said opening, a removable window section engaging said pockets, and a pair of headed elements engaging the window section and body and constituting the sole means for holding the window section in said pockets.

In testimony whereof I affix my signature.

IVAN P. FERGUSON.